US012752711B2

(12) United States Patent
Magni

(10) Patent No.: US 12,752,711 B2
(45) Date of Patent: Oct. 6, 2026

(54) TELESCOPIC BOOM LIFT

(71) Applicant: MAGNI REAL ESTATE S.R.L., Castelfranco Emilia (IT)

(72) Inventor: Riccardo Magni, Modena (IT)

(73) Assignee: MAGNI REAL ESTATE S.R.L., Castelfranco Emilia (IT)

( * ) Notice: Subject to any disclaimer, the term of this patent is extended or adjusted under 35 U.S.C. 154(b) by 354 days.

(21) Appl. No.: 18/572,366

(22) PCT Filed: Jun. 15, 2022

(86) PCT No.: PCT/EP2022/066426
§ 371 (c)(1),
(2) Date: Dec. 20, 2023

(87) PCT Pub. No.: WO2022/268621
PCT Pub. Date: Dec. 29, 2022

(65) Prior Publication Data

US 2024/0286553 A1 Aug. 29, 2024

(30) Foreign Application Priority Data

Jun. 24, 2021 (IT) ........................ 102021000016559

(51) Int. Cl.
*B60R 3/02* (2006.01)
*B66F 9/065* (2006.01)

(52) U.S. Cl.
CPC .............. *B60R 3/02* (2013.01); *B66F 9/0655* (2013.01)

(58) Field of Classification Search
None
See application file for complete search history.

(56) References Cited

U.S. PATENT DOCUMENTS 10,035,462 B2 * 7/2018 Iotti ...................... B66F 9/0655
11,254,265 B2 * 2/2022 Miller ...................... B60R 3/02
(Continued)

FOREIGN PATENT DOCUMENTS

CN 112092734 A 12/2020
CN 112224134 A 1/2021

OTHER PUBLICATIONS

International Search Report dated Aug. 26, 2022 issued in PCT/EP2022/066426.
(Continued)

*Primary Examiner* — Michael S Lowe
(74) *Attorney, Agent, or Firm* — Scully, Scott, Murphy & Presser, P.C.

(57) ABSTRACT

A telescopic boom lift, comprising at least one vehicle which can move on the ground and supports directly or indirectly at least one telescopic boom which in turn is adapted to support a work accessory, and a cab configured to accommodate an operator. The lift comprises at least one ladder for access to the cab, arranged along a wall of the vehicle and provided with at least one step which rotates with respect to the wall, for the movement of the ladder between at least two configurations for use which correspond to different space occupations of the ladder. In the first minimum space occupation configuration the step faces and is proximate to the wall; in a second configuration with increased space occupation the step is arranged transversely with respect to the wall.

7 Claims, 11 Drawing Sheets

(56) References Cited

U.S. PATENT DOCUMENTS

| | | | | |
|---|---|---|---|---|
| 2006/0006023 | A1 * | 1/2006 | Lim | B60R 3/02 182/127 |
| 2014/0158465 | A1 * | 6/2014 | Salzman | E06C 5/02 182/127 |
| 2020/0181966 | A1 | 6/2020 | Kato | |

OTHER PUBLICATIONS

Written Opinion dated dated Aug. 26, 2022 issued in PCT/EP2022/066426.

Italian Search Report and Written Opinion dated Jan. 10, 2022 issued in IT 202100016559, with partial translation.

* cited by examiner

TELESCOPIC BOOM LIFT

The present invention relates to a telescopic boom lift.

As is known, the vast category of self-propelled works vehicles comprises vehicles known as telescopic boom lifts, which are used to move bulky equipment and goods and/or to perform interventions of various kinds at considerable heights.

In the general configuration with which they are typically provided and marketed, known lifts comprise a vehicle or truck mounted on wheels or tracks, in order to travel on roads and be able to move over more or less rugged terrain (up to the place of intervention). The vehicle supports directly or indirectly (the first end of) a telescopic boom, with which accessories of various kinds may be associated, depending on the intervention that the lift is called to perform. In addition, the vehicle also often supports a cab, configured to accommodate an operator and a driving and control dashboard, which allows the operator to control the vehicle as regards both moving the vehicle and moving the boom.

Among the vehicles mentioned above, there are also some in which the boom and the cab are part of an assembly mounted rotatably on the vehicle, with the possibility to rotate about a vertical axis. Evidently, the possibility of rotation greatly increases the versatility of the vehicle, as it extends the area of intervention of the boom, multiplying the positions that can be reached by the accessory supported by said boom.

Usually, access to the cab or anyway to the equipment located on top of the vehicle (often at a significant height) is made possible by virtue of one or more ladders, placed along the walls of the vehicle.

In the configuration now commonly adopted, the ladder has a plurality of rungs or steps directly applied on the respective wall of the vehicle, so as not to increase appreciably the space occupation of the vehicle; furthermore, sometimes the rungs adhere to the wall at an appropriately provided recess, so as not to affect overall space occupation in any way.

The need to keep the space occupation low (especially the transverse space occupation, with respect to the travel direction) is related to the regulatory constraints with which the vehicles must comply in order to be able to travel on roads. More generally, this requirement ensures obvious advantages in terms of maneuverability, parking practicality and logistics.

However, this constructive solution is not free from drawbacks.

When the operator has to interact with the ladder, and particularly when he leaves the cab and wants to climb down to the ground, he finds it difficult to safely place his foot on the underlying first rung, since due to the needs identified above it protrudes only slightly from the wall. Moreover, not infrequently the wall of the vehicle is covered with mud, soil or other debris (depending, of course, on the surrounding environmental conditions and on the specific context in which the lift is called to operate), so much so that the ladder is at least partially hidden, increasing the discomfort and the risk for the operator.

The aim of the present invention is to solve the problems described above, providing a telescopic boom lift that allows the operator to climb up or down from the cab in a practical and most of all safe manner.

Within this aim, an object of the invention is to provide a telescopic boom lift provided with a ladder that allows climbing up or down from the cab in a practical and most of all safe manner.

Another object of the invention is to provide a telescopic boom lift provided with a ladder that is easy to see and use in any application context or environmental condition.

Another object of the invention is to provide a telescopic boom lift that ensures high reliability in use.

Another object of the invention is to propose a telescopic boom lift that has a technical and structural architecture that is alternative to those of lifts of the known type.

Not the least object of the invention is to provide a telescopic boom lift that can be obtained easily starting from commonly commercially available elements and materials.

Yet another object of the invention is to provide a telescopic boom lift that has low costs and is of assured application.

This aim and these and other objects that will become more apparent hereinafter are achieved by a telescopic boom lift, comprising at least one vehicle which can move on the ground and supports directly or indirectly at least one telescopic boom adapted to support a work accessory, and a cab configured to accommodate an operator, characterized in that it comprises at least one ladder for access to the cab, arranged along a wall of said vehicle and provided with at least one step which rotates with respect to the corresponding said wall, for the movement of said ladder between at least two configurations for use which correspond to different space occupations of said ladder, in a first minimum space occupation configuration said at least one step facing and being proximate to said wall, in a second configuration with increased space occupation said at least one step being arranged transversely with respect to said wall.

Further characteristics and advantages of the invention will become more apparent from the description of two preferred but not exclusive embodiments of the telescopic boom lift according to the invention, illustrated by way of non-limiting example in the accompanying drawings, wherein:

FIG. 1 is a lateral elevation view of the telescopic boom lift according to the invention;

FIGS. 2 and 3 are front elevation views of the lift of FIG. 1 with the ladder in the first and second configurations, respectively;

FIGS. 4 and 5 are axonometric views of the cab and ladder of the lift of FIG. 1, with the ladder in the first and second configurations, respectively;

FIGS. 6 and 7 are axonometric views of the ladder of the lift of FIG. 1, with the ladder in the first and second configurations, respectively;

FIGS. 8 and 9 are top views of the ladder of FIGS. 6 and 7, respectively;

FIGS. 10, 11 and 12 are lateral elevation views of the ladder of the lift of FIG. 1 with the ladder in the first configuration, in an intermediate configuration, and in the second configuration, respectively;

FIG. 13 is a lateral elevation view of the telescopic boom lift according to the invention;

FIGS. 14 and 15 are front elevation views of the lift of FIG. 13 with the ladder in the first and in second configurations, respectively;

FIGS. 16 and 17 are axonometric views of the cab and the ladder of the lift of FIG. 13, with the ladder in the first and second configuration, respectively.

Figure 1:
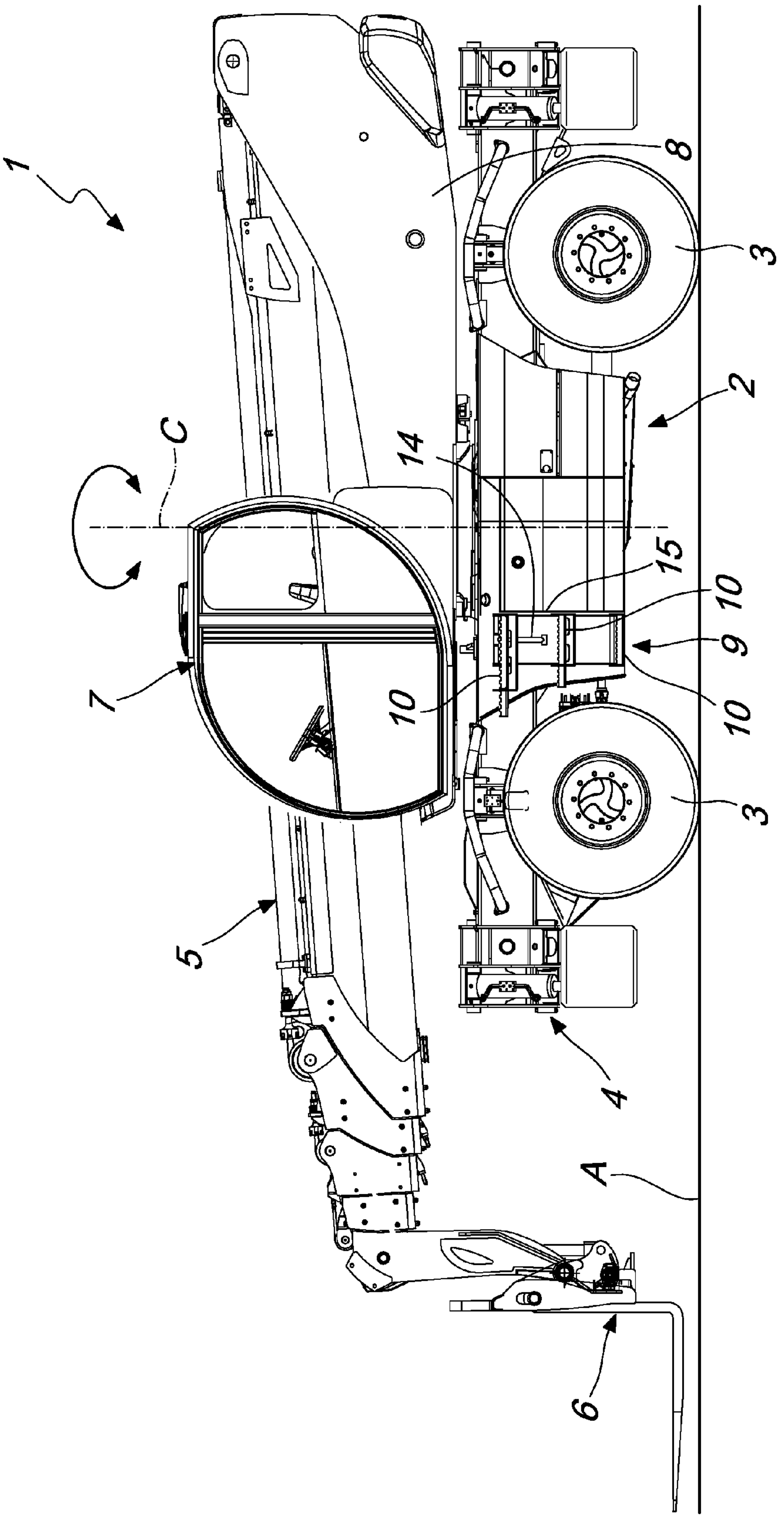
FIGS. 1 to 12 are views of the lift according to the invention in the first embodiment, more particularly.
Figure 2:
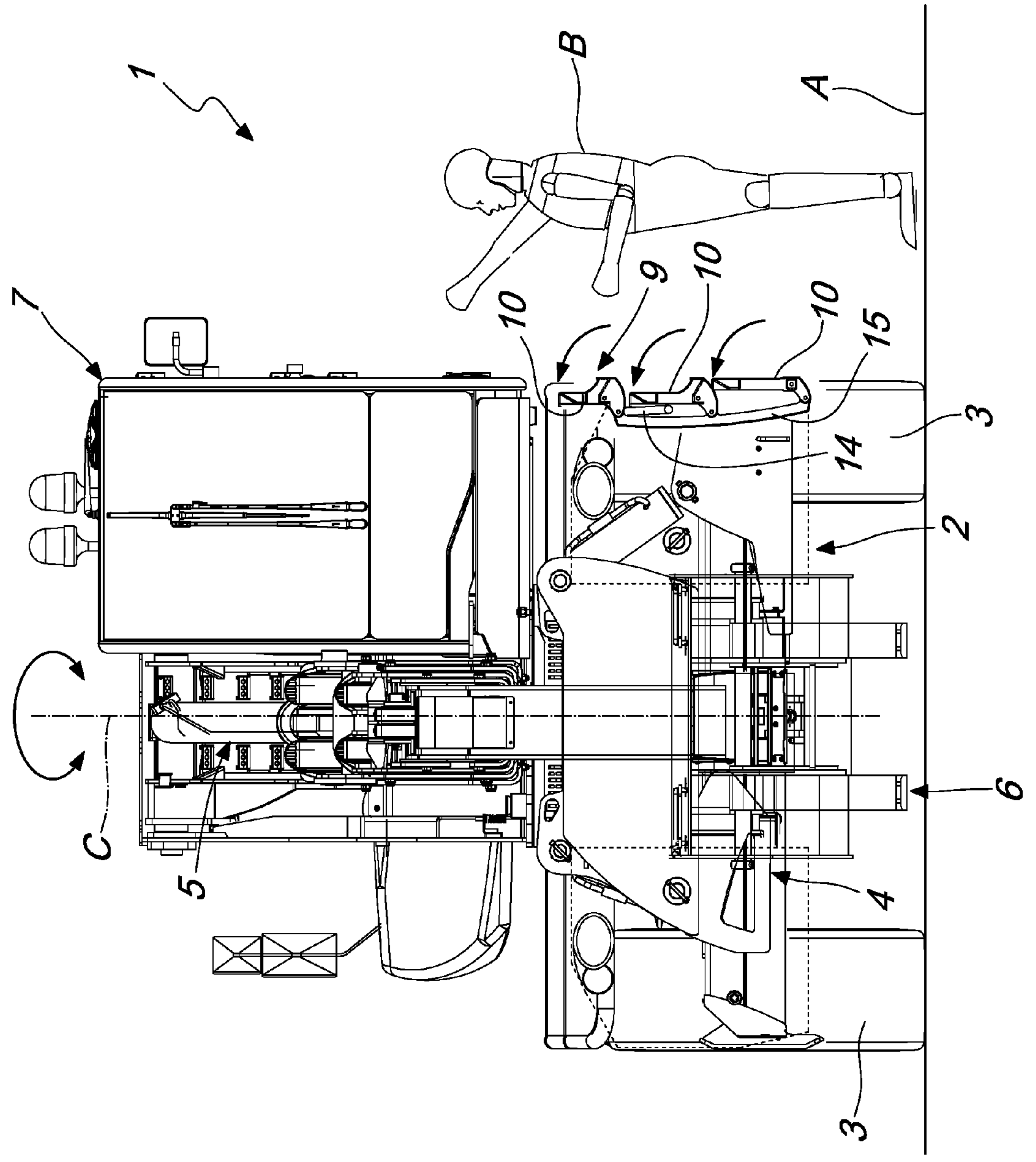
Figure 3:
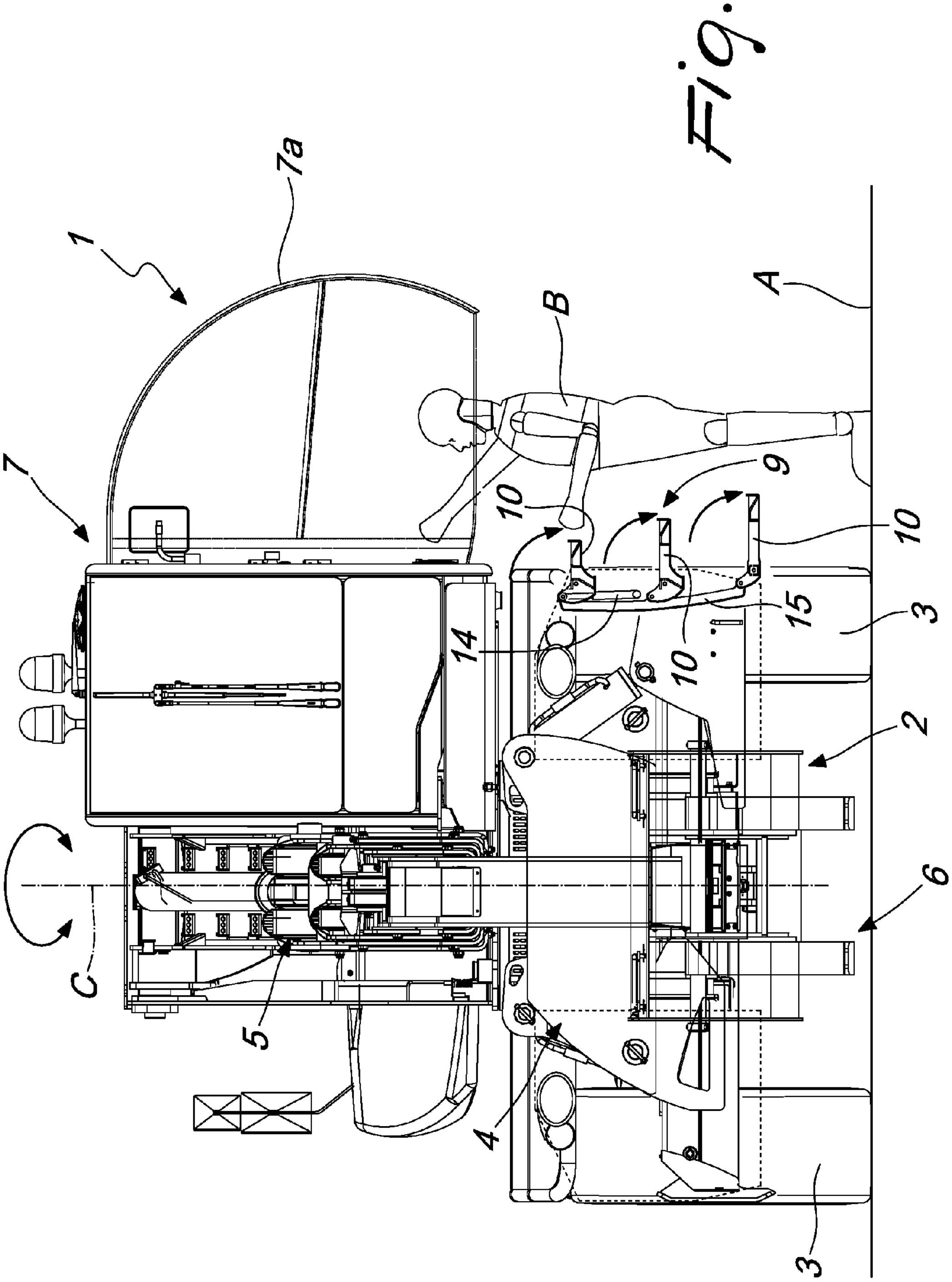
Figure 5:
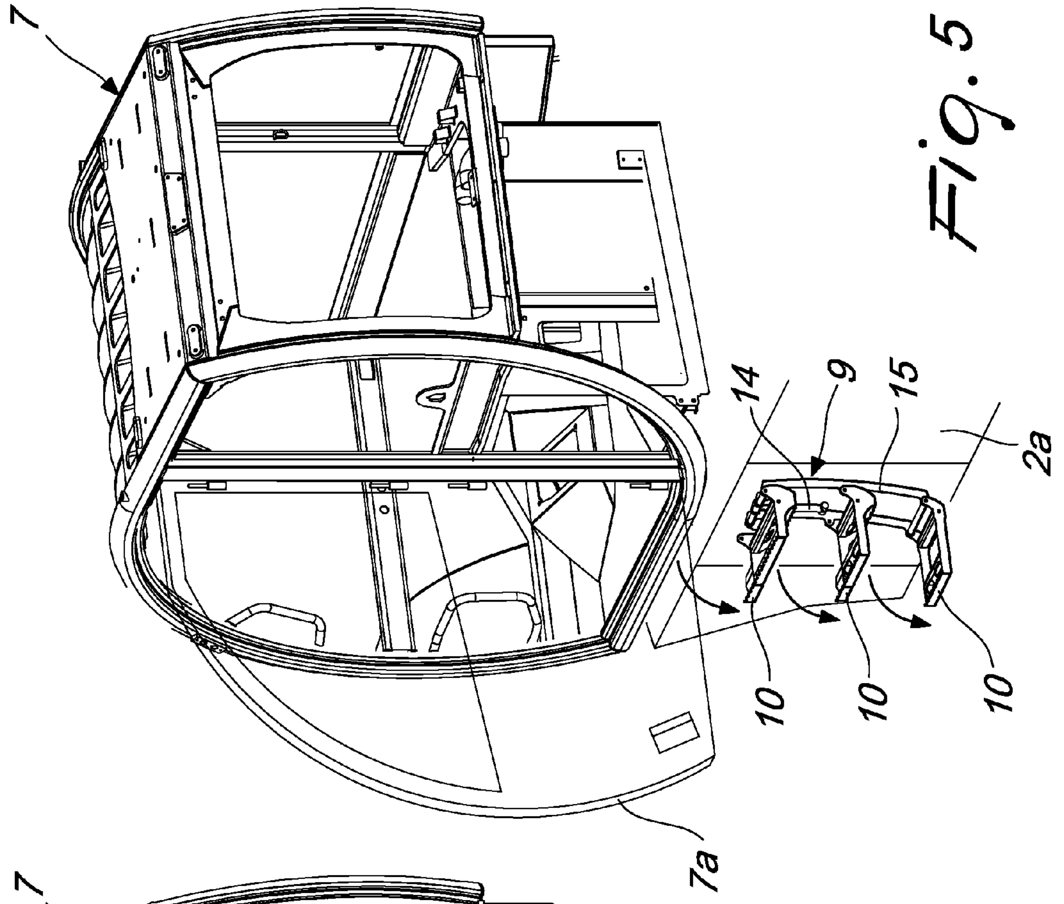
Figure 4:
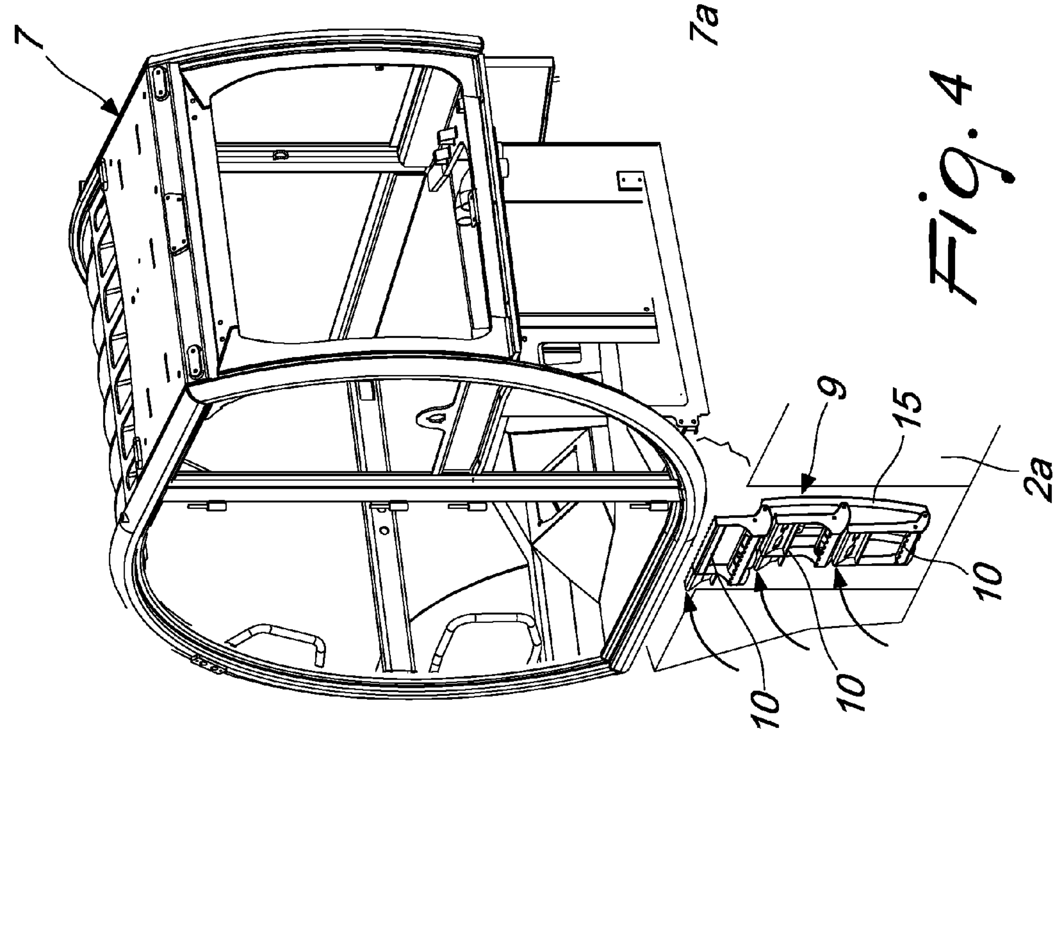
Figure 7:
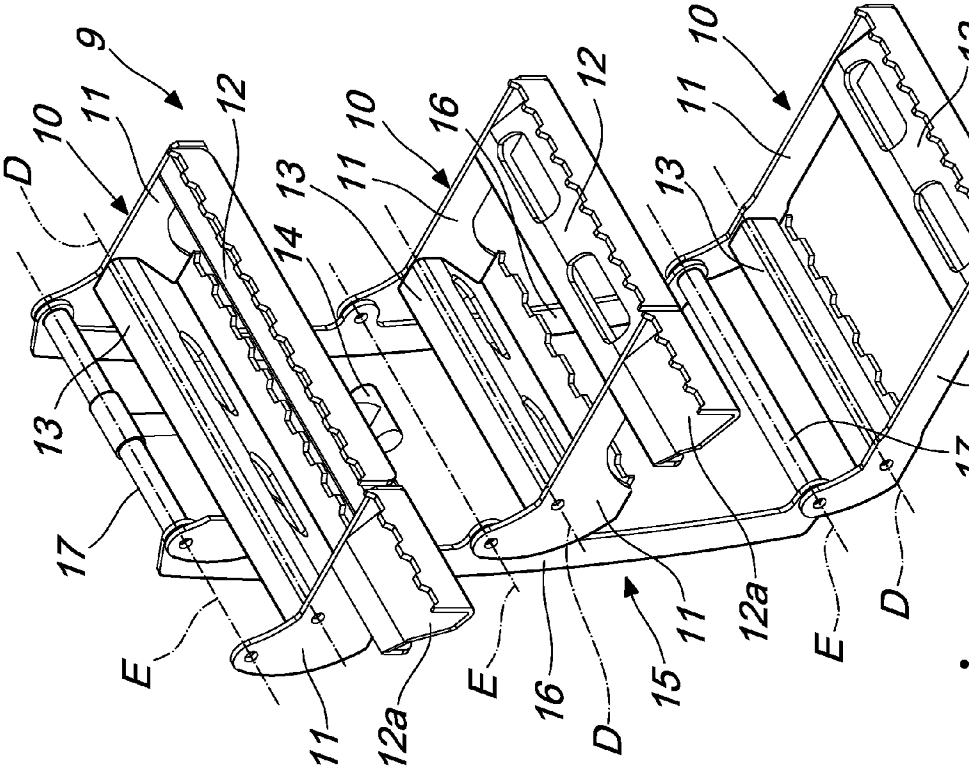
Figure 6:
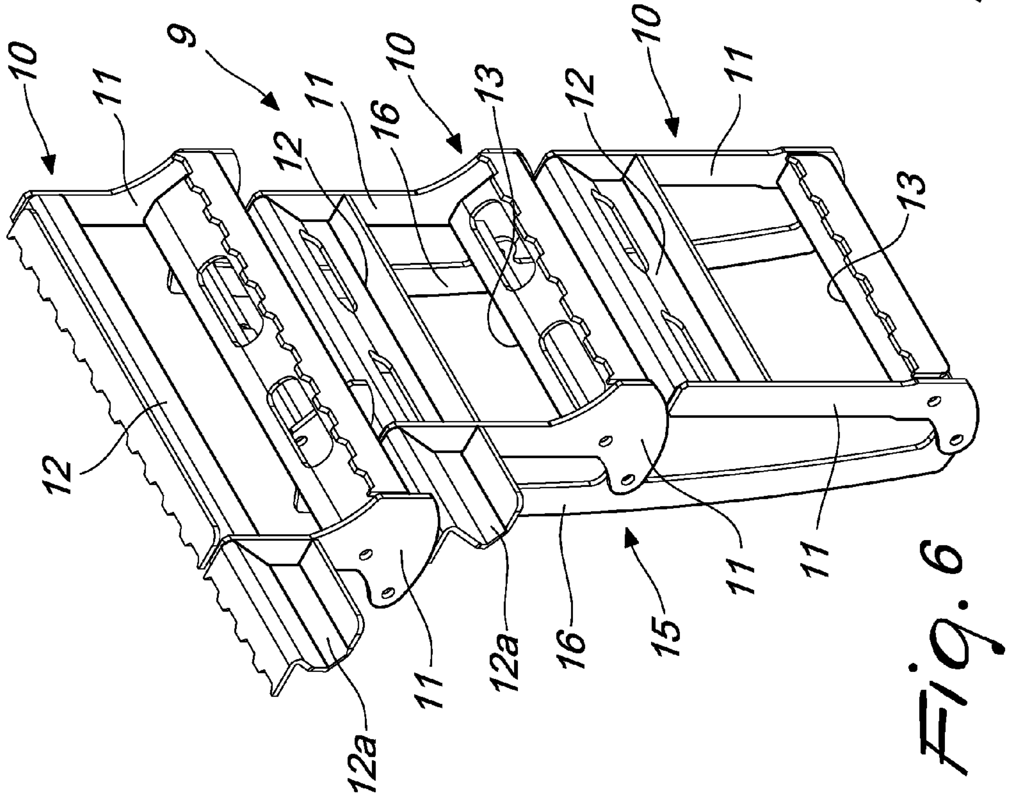
Figure 9:
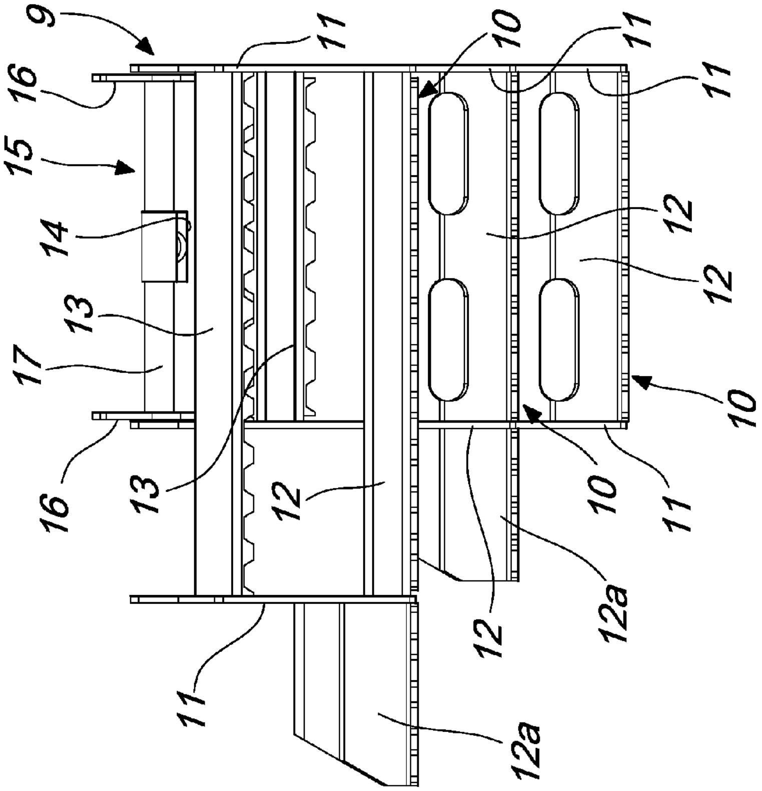
Figure 8:
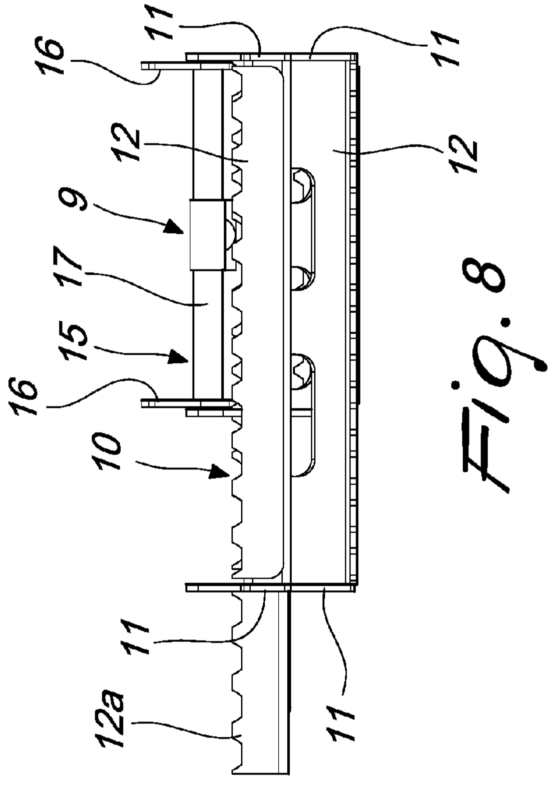

With particular reference to the figures, the reference numeral 1 generally designates a telescopic boom lift, which comprises at least one vehicle 2 (or truck), which can move on the ground A.

It should be noted that in this discussion the term "boom lift" also comprises all self-propelled work machines that are also known in the sector under the name "telescopic handler" or "telehandler".

In order to be able to move freely on the ground A (be it the road surface, farmland, the area of a building yard or any other supporting surface), the vehicle 2 is typically provided with wheels 3 or tracks, associated with an adequate traction system (which is chosen in any case of a type known per se).

More generally, the entire vehicle 2 can be of the traditional type and chosen so as to correspond to the constructive solution (among the many solutions widespread in the field) that the person skilled in the art would deem in each instance most suited for the purpose.

Furthermore, in order to be able to bear heavy loads and ensure adequate support even during interventions at high elevations, the vehicle 2 can be provided with stabilizing means 4, which also can be chosen of a known type (the embodiments shown in the figures show two different types thereof).

The vehicle 2 supports directly or indirectly at least one telescopic boom 5 adapted to support a work accessory 6.

In well-known ways, the telescopic boom 5 is typically composed of a plurality of segments or elements arranged in series and can be mutually extracted; moreover, on the opposite side with respect to the vehicle 2, the boom 5 has a free end that can be coupled to the accessory 6 of interest. The accessory 6 can be of any type: in the accompanying figures, by way of example, it has been chosen to show an accessory 6 constituted by a fork, but it might be any other object or tool suitable for the purpose for which one intends to use the lift 1 (and it might also be a platform designed to accommodate a person). The accessory 6 can also be interchangeable, so that it can be replaced at each intervention, as a function of the specific requirements. The accessory 6 or a set of accessories 6 can therefore be comprised within the lift 1, but the protective scope claimed herein also comprises lifts 1 without accessories 6, which can therefore be sourced separately.

Besides, the possibility is not excluded that the lift 1 is provided with two or more booms 5 which are for example mutually articulated.

Moreover, the vehicle 2 supports directly or indirectly a cab 7 configured to accommodate an operator B (typically in order to allow him to control the lift 1).

The embodiment of FIGS. 13-17 shows a first type of lift 1, comprised within the protective scope claimed herein, in which the cab 7 is integral with the vehicle 2 and so is the first end of the boom 5 (opposite to the accessory 6).

The embodiment of FIGS. 1-12 proposes instead a rotary lift 1 (which of course is also comprised within the protective scope claimed herein), in which the boom 5 and the cab 7 are part of an assembly which can rotate with respect to the vehicle 2, about an articulation axis C.

In greater detail, the articulation axis C about which the assembly can rotate is at right angles to the ground A and/or to the ideal resting plane that the lift 1 identifies univocally, and therefore, in an equivalent manner, one can say that the assembly can rotate (with respect to the vehicle 2) about a vertical axis C. Typically, said assembly comprises a base structure 8 (FIG. 1) supported rotatably by the vehicle 2: the telescopic boom 5 is articulated (about an axis which is horizontal or parallel to the ground A) with a first end to the structure 8, which rigidly supports the cab 7.

With reference to the ground A and/or the ideal resting plane, it is specified that terms or expressions (optionally used hereinafter) such as "upper" or "lower", "high" or "low", "horizontal" or "vertical", etcetera, shall be referred specifically to them.

It is stressed, moreover, that for all the aspects not discussed in the present description, any constructive detail related to the vehicle 2, the stabilizing means 4, the boom 5, the cab 7, the traction means (of the vehicle 2) and movement means (of the boom 5, of the cab 7 and/or of the rotating assembly), the electronic equipment and others, can be of a known type. In particular, therefore, the person skilled in the art can choose in each instance the equipment and the embodiment deemed most appropriate, based on common skills of the field and as a function of the specific requirements, without in any case abandoning the protective scope claimed herein.

According to the invention, the lift 1 comprises at least one ladder 9 for access to the cab 7 (in order to climb into it or down from it), arranged along a wall 2*a* of the vehicle 2. Typically, the ladder 9 is arranged for this purpose below a door 7*a* (FIGS. 3, 5, 15 and 17) of the cab 7; in the case of rotary lifts 1, the ladder 9 can be arranged so as to be below the cab 7 and the door 7*a* particularly when the rotating assembly is aligned with the vehicle 2, in the minimum transverse space occupation configuration, suitable for road travel.

It is stressed that the lift 1 is provided with a single ladder 9, associated with selectively one of the four walls 2*a* of the vehicle 2 (the two side walls, the front wall, and the rear wall). Likewise, the choice to associate with one or more walls 2*a* of the vehicle 2 one or more ladders 9, in order to offer different options to the operator B from which to choose the most practical one for climbing into or down from the cab 7 (particularly if said cab 7 changes position with respect of the vehicle 2, in the case of rotary lifts 1), is comprised within the protective scope claimed herein.

What will be described hereinafter regarding a ladder 9 may be understood to apply to selectively any number of ladders 9 and preferably to all of them (if more than one is present).

The ladder 9 is provided with at least one step 10 which rotates with respect to the corresponding wall 2*a* (the one along which the ladder 9 is arranged) and therefore also with respect to the vehicle 2: the possibility to rotate thus allows the movement of said ladder 9 between at least two configurations for use (between at least one first configuration and one second configuration) which correspond to different space occupations of said ladder 9. The expression "space occupation" in the present description is understood to reference the space or volume occupied by the ladder 9 and therefore the increase of the maximum dimensions of the vehicle 2 due to the ladder 9 (an increase which is variable in relation to the configuration assumed).

In the first minimum space occupation configuration, the step 10 (or each step 10) is arranged facing and proximate to the wall 2*a* of the vehicle 2, while in the second configuration, with increased space occupation (with respect to the space occupation in the first configuration), the step 10 (or each step 10) is arranged transversely with respect to the wall 2*a*. In an equivalent manner, it can be said that in the first configuration the step 10 (or each step 10) is arranged substantially parallel to the wall 2*a* or at right angles to the ideal resting plane (to the ground A), while in the second configuration the step 10 (or each step 10) is arranged transversely to the wall 2*a* (at an angle that can vary at will) and preferably substantially perpendicular to the wall 2*a* (parallel to the ground A). Thus, in the second configuration each step 10 protrudes more outward and remains more easily identifiable for the operator B, especially from above (such as when he has to exit from the cab 7). In other words, therefore, one can say that the movement between the two configurations consists of a variation of the distance from the respective wall 2*a* of the resting point offered to the operator B by the step 10.

Figure 12:
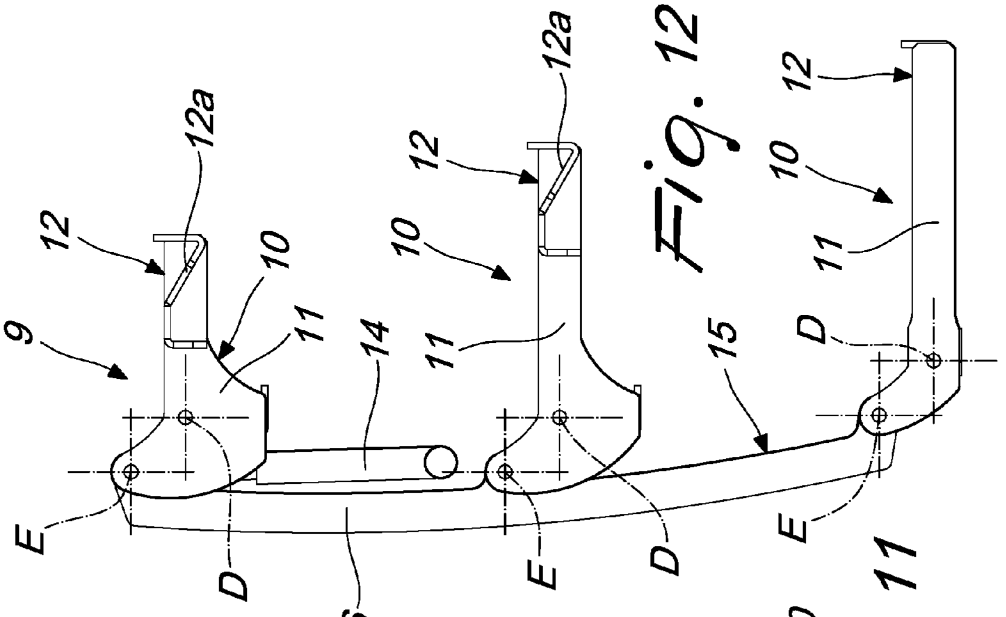
Figure 11:
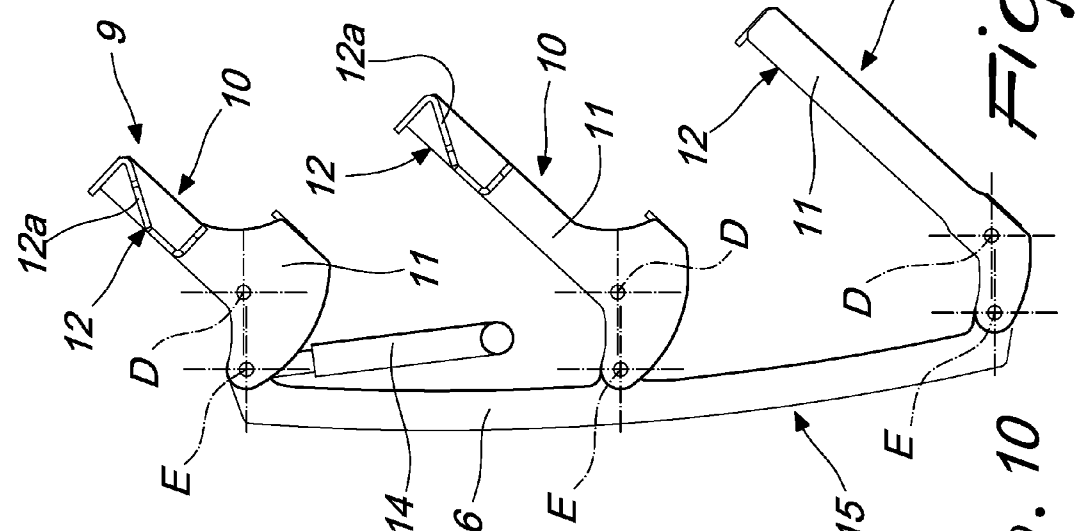
Figure 10:
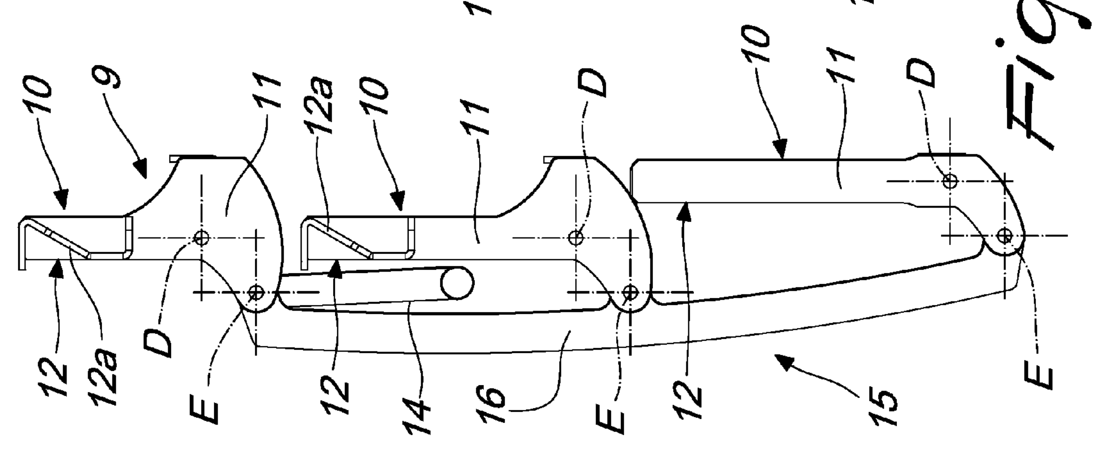
Figure 13:
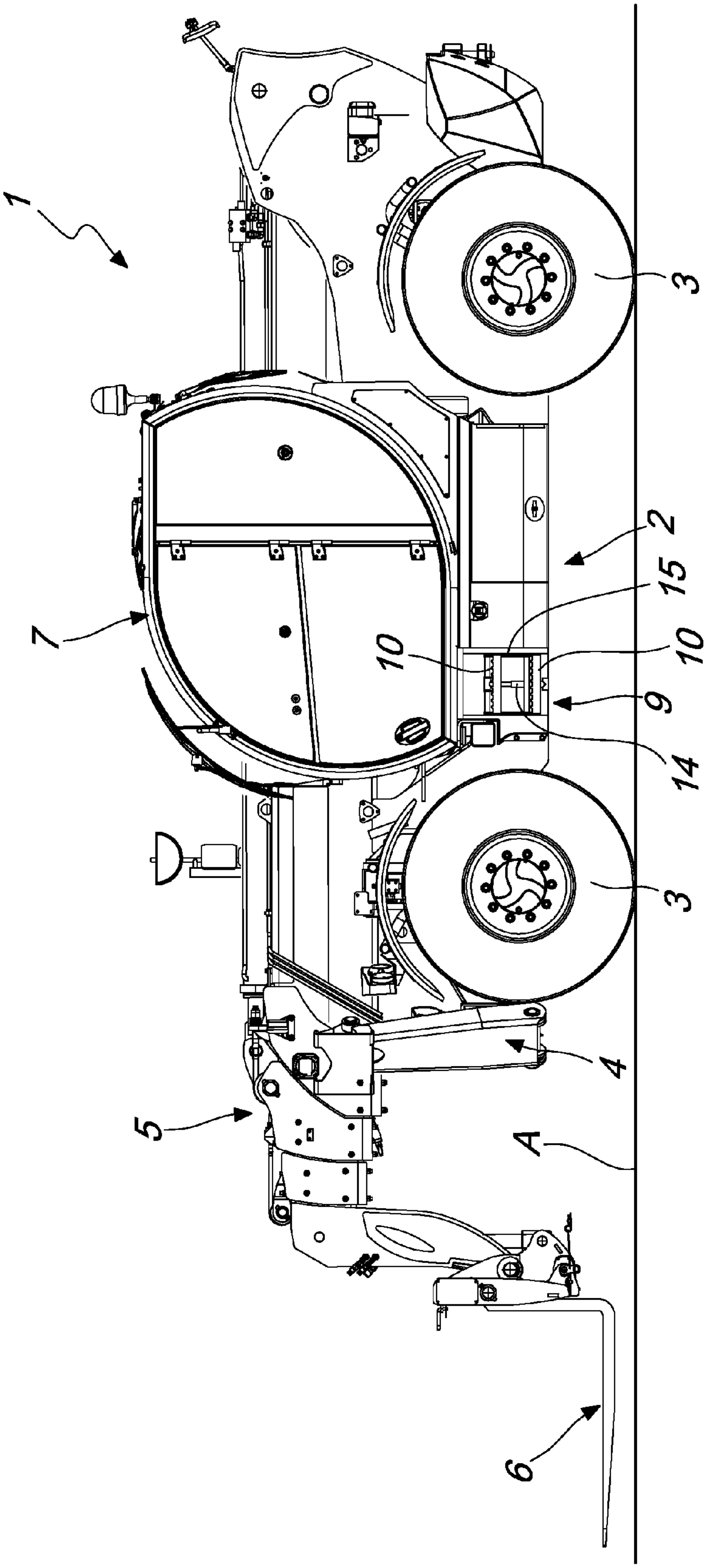
FIGS. 13 to 17 are views of the lift according to the invention in the second embodiment, more particularly.
Figure 14:
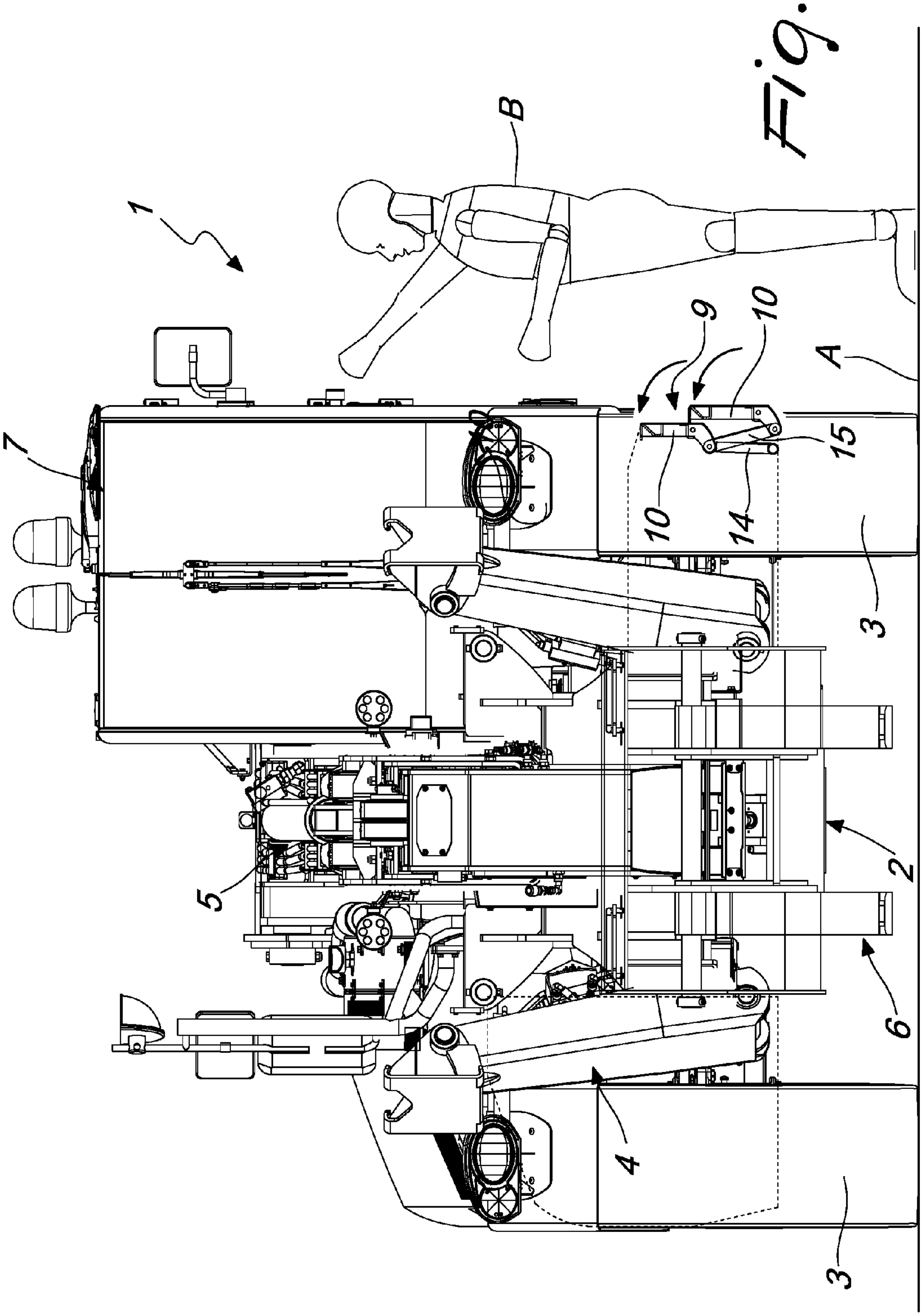
Figure 15:
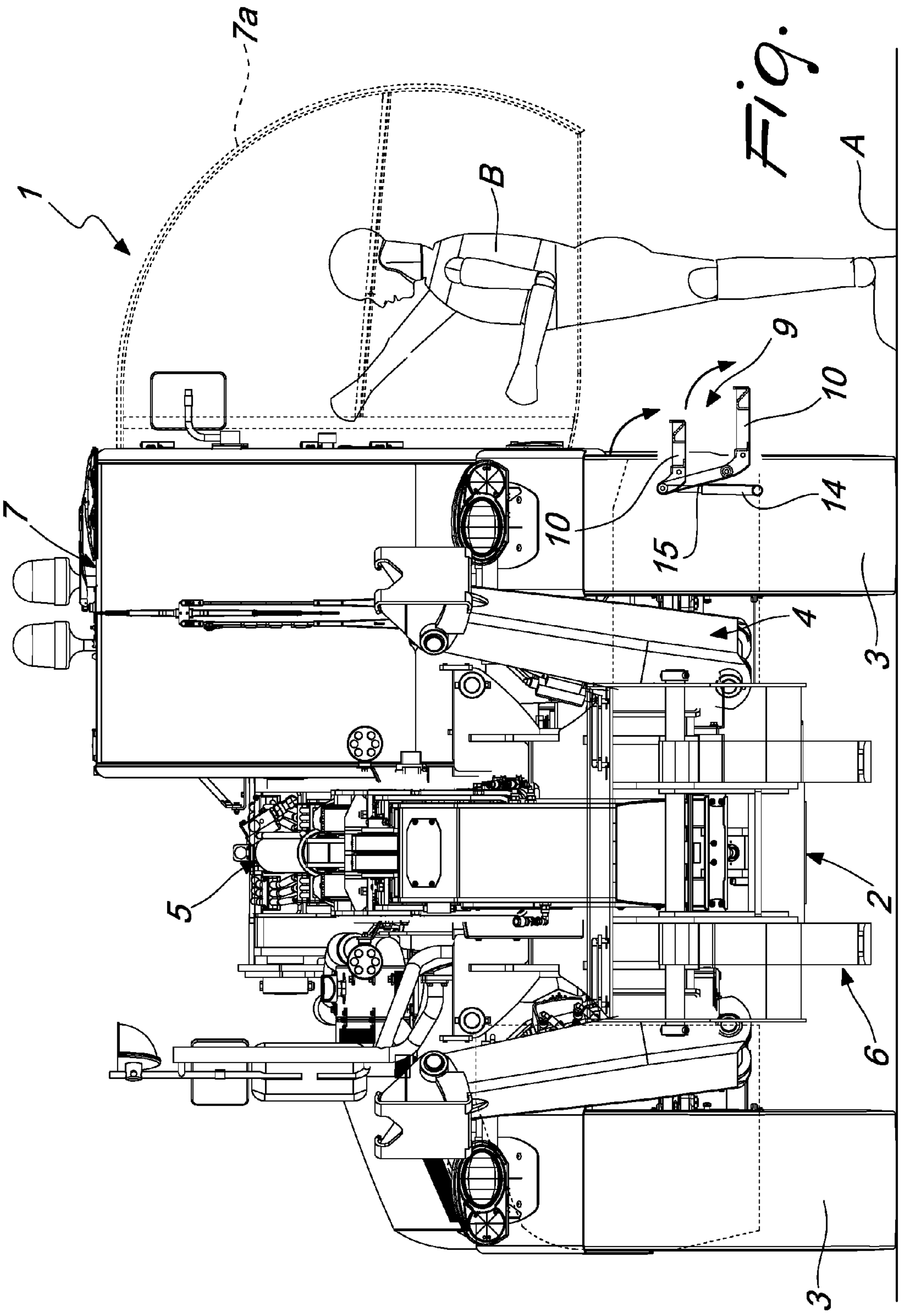
Figure 17:
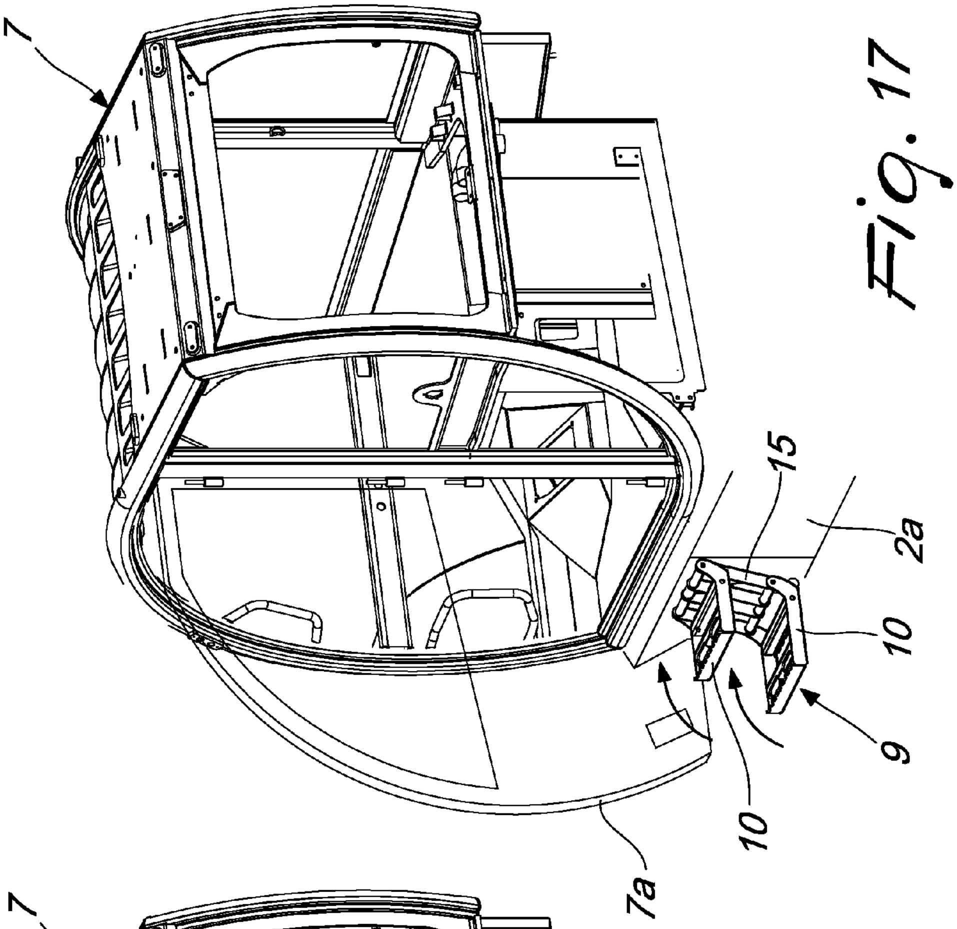
Figure 16:
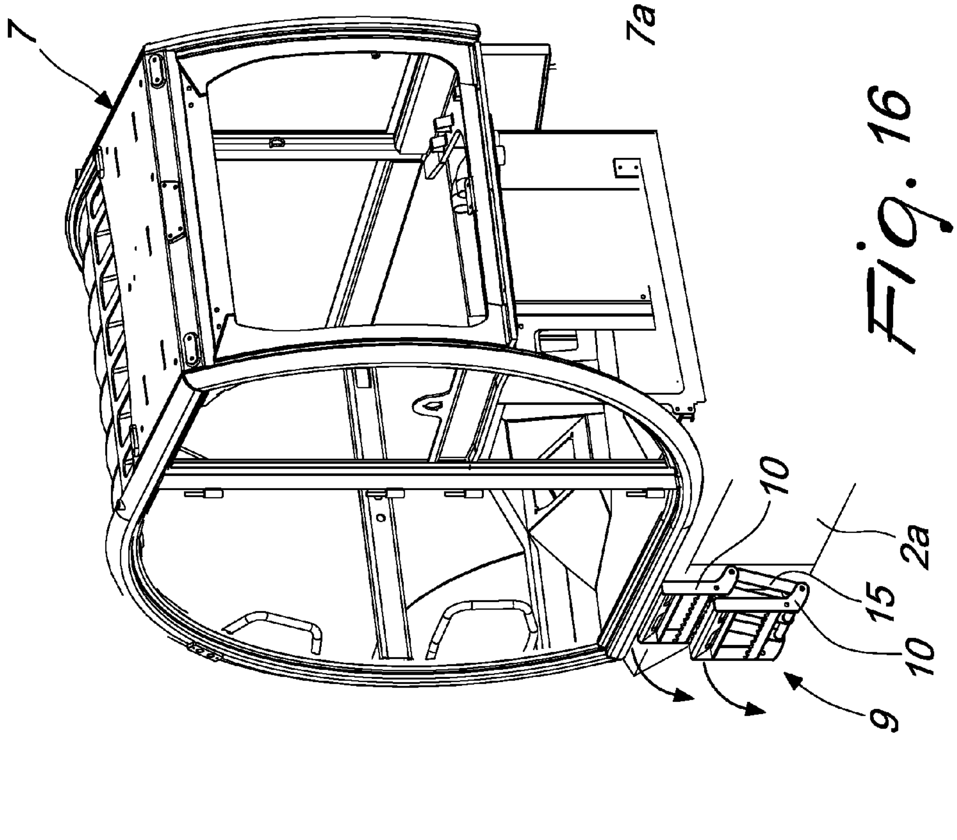

The ladder 9 of FIGS. 2, 4, 6, 8, 10, 14 and 16 is shown in the first configuration, while FIGS. 3, 5, 7, 9, 12, 15 and 17 show examples of ladders 9 in the second configuration. In particular, the different space occupation is easily visible by mutually comparing the two top views of FIGS. 8 and 9. FIGS. 10 to 12 furthermore show in sequence the transition from the first configuration to the second configuration.

The ladder 9, by virtue of the rotating step 10, achieves the intended aim: it is in fact possible to keep it in the first configuration during road travel or in any case in all those contexts in which it is preferred to keep the space occupation of the vehicle 2 and of the lift 1 in general low. Vice versa, when the operator B wants to climb up or down the ladder 9, it is possible to bring it to the second configuration, in which the step 10 (or each step 10) protrudes more markedly and evidently from the wall 2*a* of the vehicle 2, and it is therefore easier, and most of all safer, to identify said step 10 and descend along them.

It should be noted that the shape and the dimensions of the ladder 9 can be chosen such as to adapt in an optimum manner to the vehicle 2: for example, FIG. 1 highlights that the width of the various steps 10 (they are three in the specific embodiment shown) is chosen progressively decreasing downward, in order to follow the profile of the adjacent wheel 3.

Moreover, to eliminate the increase in space occupation due to the ladder 9, at least as long as it is kept in the first configuration, its dimensions may be chosen such that it does not protrude in any way from a hollow or recess formed by the wall 2*a*.

The number of steps 10 of the ladder 9 may be any: for example, the possibility is mentioned that they may be two in the case of lifts 1 without a rotating assembly and/or otherwise with a reduced vertical extension (FIGS. 13-17) and that they may instead be three for rotary lifts 1 or otherwise taller lifts (FIGS. 1-12).

What has been stated and will be stated hereinafter about a step 10 may be understood to apply to any number at will of steps 10 and also to all the steps 10 that are present.

In particular, preferably the lift 1 comprises a plurality of steps 10, which in the first configuration are substantially arranged in mutual alignment (in order to keep space occupation to a minimum). In other words, and as shown clearly for example by FIG. 10, in the first configuration the steps 10 are arranged vertically (at right angles to the ground A and/or the ideal resting plane) and in practice are ideally contained in a same plane, which is substantially parallel to the wall 2*a*.

More particularly, in the second configuration the step 10 (or also each step 10) is preferably rotated substantially through 90° with respect to the first configuration. Therefore, in the second configuration each step 10 is arranged horizontally (parallel to the ground A and/or to the ideal resting plane); if there is a plurality of steps 10, they are arranged at different distances from the ground A and/or from the ideal resting plane. In any case, the possibility is not excluded that the second configuration is obtained from the first configuration with a rotation of the steps 10 of different extent.

In the preferred embodiment, described herein and shown in the accompanying figures by way of non-limiting example of the application of the invention, at least one step 10 (and preferably all) comprises two arms 11 which are coupled rotatably, optionally indirectly, to the wall 2*a* (and to the vehicle 2) about a common rotation axis D (shown for the sake of simplicity only in FIGS. 7 and 10 to 12), and a tread 12, which is interposed between the arms 11 oppositely with respect to the wall 2*a* and is adapted to allow the resting of the foot of the operator B at least in the second configuration, in order to allow him to access the cab 7 or climb down to the ground A. Obviously, if the steps 10 are two or more, each one will be rotatable with its arms 11 about a respective rotation axis D (as clearly shown in the accompanying figures).

Thus, it is indeed with a rotation about the respective axis D that each step 10 moves from the first configuration to the second, and vice versa (as FIGS. 10-12 highlight clearly).

It is specified that the term "tread" is understood to mean, in the present description, an element (plate, rung, sheet, beam, bar, etcetera) conveniently shaped and sized in order to offer to the operator B, and to his feet in particular, a suitable resting. Moreover, at least some treads 12 may be extended with appendages 12*a* beyond one or both of the respective arms 11 (as in the accompanying figures) in order to follow in the best manner the profile of the adjacent wheel 3 or in any case the geometry of the vehicle 2.

In particular, as FIG. 12 clearly shows, for example, in the second configuration the treads 12 (the respective upper walkable surfaces, at least) are arranged substantially parallel to the ground A (and typically at right angles to the wall 2*a* of the vehicle 2).

Usefully, at least one step 10 (and preferably all of them) comprises a connecting rib 13, which is interposed between the arms 11; the rib 13 is arranged between the wall 2*a* and the respective tread 12 and has a ledge configured in turn for the resting of the foot of the operator B in the first configuration.

Thus, the rib 13 proves to be very useful, since it still provides the operator B with a convenient way to access the cab 7 or to climb down from it, even when the ladder 9 is gathered in the first minimum space occupation configuration.

Like the treads 12, in practice the ribs 13 also can be constituted by any element (plate, rung, sheet, beam, bar, etcetera) conveniently shaped and sized to offer to the operator B, and to his feet in particular, a suitable resting.

If there is more than one step 10, their movement can occur in a rigidly coupled manner (a preferred choice, in order to speed up the transition from one configuration to the other while reducing the effort for the operator B); alternatively, each step 10 might be movable independently of the others.

In a first choice of embodiment of the invention, the movement of each step 10 is performed manually, for example by simply gripping it and pushing it to rotate.

Preferably, the lift 1 according to the invention comprises means for the direct or indirect movement of the step or steps 10, which are configured for the actuation of the transition from the first configuration to the second configuration and vice versa.

The means may also be of the manual type, i.e., entrusting to the operator B the task of generating the force required for the movement. In this regard, the means may comprise levers or grip portions of various kinds associated with the steps 10 and more convenient to grip than said steps 10.

In the preferred embodiment, illustrated only by way of example in the accompanying figures, the means comprise an actuator 14 which is adapted for the direct or indirect movement of the step or steps 10. The actuator 14 can be of any type, and the possibility that it might be of a hydraulic type (a hydraulic cylinder), pneumatic or electric type is mentioned merely by way of example.

The actuator 14 can be associated in various ways with a push-button or other control element, to allow the operator B to cause the movement (the rotation about the rotation axis D) when necessary.

More particularly, in the preferred embodiment the steps 10 are coupled rotatably about respective pivoting axes E (shown for the sake of simplicity only in FIGS. 7 and 10 to 12) to a movable member 15, which is moved directly by the actuator 14 and is configured in order to determine (the rotation about the respective rotation axes D and therefore) the simultaneous transition of the steps 10 from the first configuration to the second configuration, and vice versa. The use of the member 15 proves to be of particular interest if two or more steps 10 are provided, since the member 15 integrally and jointly turns them. However, it is not excluded to interpose a movable member similar to the member 15 between the actuator 14 and a single step 10 (or to interpose a respective movable member between the actuator 14 and each step 10).

Even more particularly, the member 15 comprises two stringers 16 and at least one crossmember 17, which is interposed between respective ends of the stringers 16; the arms 11 of each step 10 are coupled rotatably about respective pivoting axes E to corresponding stringers 16, while the actuator 14 has a movable stem which is coupled with one end to the crossmember 17 to cause the rotation of the arms 11, and of the steps 10, about the corresponding rotation axes D (and therefore the transition between the configurations) as a consequence of the translation of the stem. In particular, the crossmembers 17 might be two, arranged on opposite sides of the stringers 16, as shown in the accompanying figures (with the movable stem that in this case is, for example, coupled to the upper crossmember 17).

In any case, it is stressed that the choice of providing a member 15 configured as shown above is only one possible practical option, which certainly does not limit the invention: the member 15 might in fact also have only one stringer 16 or might assume other configurations, even very different and more or less complex ones than the one in the figures, and it might also be differently coupled to the actuator 14 and/or the steps 10.

In order to avoid encumbering the other figures excessively, the reference numerals of the arms 11, treads 12, ribs 13, stringers 16 and crossmembers 17 are shown, where possible, only in FIGS. 6-13.

The actuator 14, coupled for example directly to the vehicle 2, can thus determine with a single movement of its movable stem, which is coupled to a crossmember 17 of the member 15, the displacement of said member 15 and therefore the desired rotation of the steps 10 about the rotation axis D, for the transition of the ladder 9 from the first configuration to the second configuration, and vice versa.

Moreover, the activation of the actuator 14 is subject to the clearance of an electronic control and management unit, which verifies instant by instant that the conditions are suitable for the movement of the ladder 9, for example preventing this from occurring accidentally when the vehicle 2 is moving.

The control and management unit is typically (but not exclusively) a controller, a computer, or other hardware, reprogrammable or not (for example with a microprocessor) and is usually the same one that is entrusted with controlling the entire lift 1 (and is therefore provided with additional instructions for the task described above). However, it is not excluded to provide a dedicated electronic module, to be installed on the lift 1 and intended exclusively for the mentioned task.

The operation of the rotating telescopic boom lift according to the invention is clear from what has already been described, but a summary is presented hereinafter.

In ways traditional per se, the vehicle 2 can move on the ground A to reach the exact location and point where it is necessary to perform an intervention (usually at a certain height above the ground A), for which the use of the lift 1 (of the accessory 6 mounted on the boom 5) is required. In greater detail, after reaching the point of intervention it is possible to activate the means 4, in order to obtain a more stable grip on the ground A, and then move the boom 5 (by rotating it and making the sliding elements slide with respect to each other) and optionally the cab 7, until the accessory 6 is brought to the exact intervention point.

When the operator B wishes to climb into or down from the cab 7, he can make valid use of the ladder 9 placed along the wall 2*a* of the vehicle 2 by rotating the steps 10 about the respective rotation axes D and therefore bringing it to the second configuration, with increased space occupation, in which said steps 10 are spaced from said wall 2*a* (the distance is preferably different for each step 10, for obvious reasons of practicality).

The ladder 9 thus protrudes significantly from the wall 2*a*, being easily visible and identifiable (and usable) for the operator B, who can use it in complete safety.

Vice versa, when its use is not required, the ladder 9 is preferably kept in the first minimum space occupation configuration, so as to offer better maneuverability of the vehicle 2 and not compromise compliance with road traffic regulations (which set limits on the maximum dimensions of the vehicle 2 and of the lift 1 in general). In particular, in the first configuration the steps 10 remain substantially aligned with each other, and can be arranged in a hollow or recess of the wall 2*a*, or in any case adjacent to it.

In practice it has been found that the lift 1 according to the invention fully achieves the intended aim, since the ladder 9, with which it is provided, allows the operator B to climb into or down from the cab 7 in a practical and most of all safe manner: in fact, in the second configuration the steps 10 extend significantly out of the outline of the vehicle 2, facilitating use and increasing safety in a certainly significant manner. Thus, the operator B can rely on a ladder 9 that is extended not only vertically (as occurs in known solutions, and in the first configuration of the ladder 9) but also has an appreciable depth.

Moreover, even in the first configuration, the operator B can use the ladder 9 to climb up or down, thanks to the ribs 13 that can be placed for this purpose according to the requirements imposed by current regulations.

Although a manual (and/or mutually independent for each step 10) movement mode is provided, the actuator 14 increases practicality of use, since a single device allows the synchronized movement of all the steps 10, thus quickly and without imposing any strain on the operator B.

The possibility to space the steps 10 from the wall 2*a* of the vehicle 2 in the second configuration of the ladder 9 makes it easy to see and use them in any application context or environmental condition.

The constructive simplicity that characterizes the ladder 9 is furthermore a guarantee of low cost and reliability, even over time.

The invention thus conceived is susceptible of numerous modifications and variations, all of which are within the scope of the appended claims. All the details may furthermore be replaced with other technically equivalent elements.

In the examples of embodiment shown, individual characteristics, given in relation to specific examples, may actually be replaced with other different characteristics that exist in other examples of embodiment.

In practice, the materials used, as well as the dimensions, may be any according to the requirements and the state of the art.

The disclosures in Italian Patent Application No. 102021000016559 from which this application claims priority are incorporated herein by reference.

The invention claimed is:

1. A telescopic boom lift, comprising at least one vehicle which can move on the ground and supports directly or indirectly at least one telescopic boom adapted to support a work accessory, and a cab configured to accommodate an operator, and further comprising at least one ladder for access to the cab, arranged along a wall of said vehicle and provided with at least one step which rotates with respect to said wall, for a movement of said ladder between at least two configurations for use which correspond to different space occupations of said ladder, in a first minimum space occupation configuration said at least one step facing and being proximate to said wall, in a second configuration with increased space occupation said at least one step being arranged transversely with respect to said wall, wherein said at least one step comprises two arms which are coupled rotatably to said wall about a common rotation axis, and a tread, which is between said arms opposite to said wall and is adapted to allow resting of a foot of the operator at least in said second configuration, in order to allow said operator to access said cab or climb down to the ground, and wherein said at least one step comprises a connecting rib which is interposed between said arms, said rib being arranged between said wall and the respective said tread and having a ledge configured for the resting of the foot of the operator in said first configuration.

2. The lift according to claim 1, further comprising a plurality of said steps arranged in mutual alignment in said first configuration.

3. The lift according to claim 1, wherein in said second configuration said at least one step is rotated substantially through 90° with respect to said first configuration.

4. The lift according to claim 1, further comprising means for a direct or indirect movement of said at least one step, which are configured for an actuation of a transition from said first configuration to said second configuration and vice versa.

5. The lift according to claim 4, wherein said means for a direct or indirect movement of said at least one step comprise an actuator which is adapted for the direct or indirect movement of said at least one step.

6. The lift according to claim 5, wherein said steps are coupled rotatably about respective pivoting axes to a movable member which is moved directly by said actuator and is configured for a simultaneous transition of said steps from said first configuration to said second configuration and vice versa.

7. The lift according to claim 6, wherein said member comprises two stringers and at least one crossmember which is interposed between respective ends of said stringers, said arms of each one of said steps being coupled rotatably about respective said pivoting axes to corresponding said stringers, said actuator having a movable stem which is coupled with one end to said at least one crossmember for a rotation of said arms, and of said steps, about corresponding said rotation axes as a consequence of a translation of said stem.

* * * * *